US011696279B2

(12) United States Patent
Josan et al.

(10) Patent No.: US 11,696,279 B2
(45) Date of Patent: Jul. 4, 2023

(54) MITIGATING RECEIVE TIME DIFFERENCE WHEN USING A SINGLE BEAM IN INTER-BAND CARRIER AGGREGATION

(71) Applicant: QUALCOMM Incorporated, San Diego, CA (US)

(72) Inventors: Awlok Singh Josan, San Francisco, CA (US); Valentin Alexandru Gheorghiu, Yokohama (JP)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 17/301,084

(22) Filed: Mar. 24, 2021

(65) Prior Publication Data

US 2021/0307033 A1 Sep. 30, 2021

Related U.S. Application Data

(60) Provisional application No. 63/003,048, filed on Mar. 31, 2020.

(51) Int. Cl.

| H04W 56/00 | (2009.01) |
|---|---|
| H04W 72/1263 | (2023.01) |
| H04L 27/26 | (2006.01) |
| H04W 72/044 | (2023.01) |
| H04W 16/28 | (2009.01) |
| H04W 72/0446 | (2023.01) |
| H04W 72/50 | (2023.01) |

(52) U.S. Cl.
CPC ..... *H04W 72/1263* (2013.01); *H04L 27/2607* (2013.01); *H04W 16/28* (2013.01); *H04W 72/046* (2013.01); *H04W 72/0446* (2013.01); *H04W 72/535* (2023.01)

(58) Field of Classification Search
CPC ............. H04W 72/1263; H04W 16/28; H04W 72/0446; H04W 72/046; H04W 72/1257; H04L 27/2607
USPC ........................................................ 370/329
See application file for complete search history.

(56) References Cited

U.S. PATENT DOCUMENTS

| 6,526,039 | B1* | 2/2003 | Dahlman | ............ | H04W 56/002 |
|---|---|---|---|---|---|
| | | | | | 375/150 |
| 8,982,851 | B2* | 3/2015 | Agrawal | ............... | H04L 1/1893 |
| | | | | | 370/335 |
| 2011/0176483 | A1* | 7/2011 | Palanki | ............. | H04W 56/0015 |
| | | | | | 370/328 |
| 2014/0241549 | A1* | 8/2014 | Stachurski | ............. | H04R 3/005 |
| | | | | | 381/92 |
| 2016/0043848 | A1* | 2/2016 | Kim | ...................... | H04L 5/0016 |
| | | | | | 370/335 |

(Continued)

*Primary Examiner* — Sai Ming Chan
(74) *Attorney, Agent, or Firm* — Harrity & Harrity, LLP

(57) ABSTRACT

Various aspects of the present disclosure generally relate to wireless communication. In some aspects, a user equipment (UE) may determine a receive time difference (RTD) between a first base station and a second base station based at least in part on the UE using a common beam to receive transmissions from the first base station and the second base station. The UE may transmit information indicating the RTD between the first base station and the second base station, wherein the transmissions from the first base station and the second base station may be scheduled based at least in part on the RTD between the first base station and the second base station. Numerous other aspects are provided.

30 Claims, 4 Drawing Sheets

(56) References Cited

U.S. PATENT DOCUMENTS

| | | | | |
|---|---|---|---|---|
| 2016/0057697 | A1* | 2/2016 | Sirotkin | H04W 48/18 |
| | | | | 370/331 |
| 2016/0198375 | A1* | 7/2016 | Sundberg | H04W 36/38 |
| | | | | 370/280 |
| 2016/0261306 | A1* | 9/2016 | Seller | G01S 5/14 |
| 2017/0230087 | A1* | 8/2017 | Sun | H04W 56/0045 |
| 2018/0027466 | A1* | 1/2018 | Trott | H04W 36/30 |
| | | | | 455/437 |
| 2018/0192438 | A1* | 7/2018 | John Wilson | H04W 74/004 |
| 2018/0324770 | A1* | 11/2018 | Nogami | H04W 72/042 |
| 2019/0222411 | A1* | 7/2019 | Xie | H04W 72/12 |
| 2020/0084736 | A1* | 3/2020 | Regunathan | H04B 7/18513 |
| 2020/0351738 | A1* | 11/2020 | Huang | H04B 17/364 |
| 2021/0298108 | A1* | 9/2021 | Wu | H04W 56/0045 |
| 2022/0109527 | A1* | 4/2022 | Hwang | H04L 5/0055 |
| 2022/0272650 | A1* | 8/2022 | Ko | H04W 56/0045 |

* cited by examiner

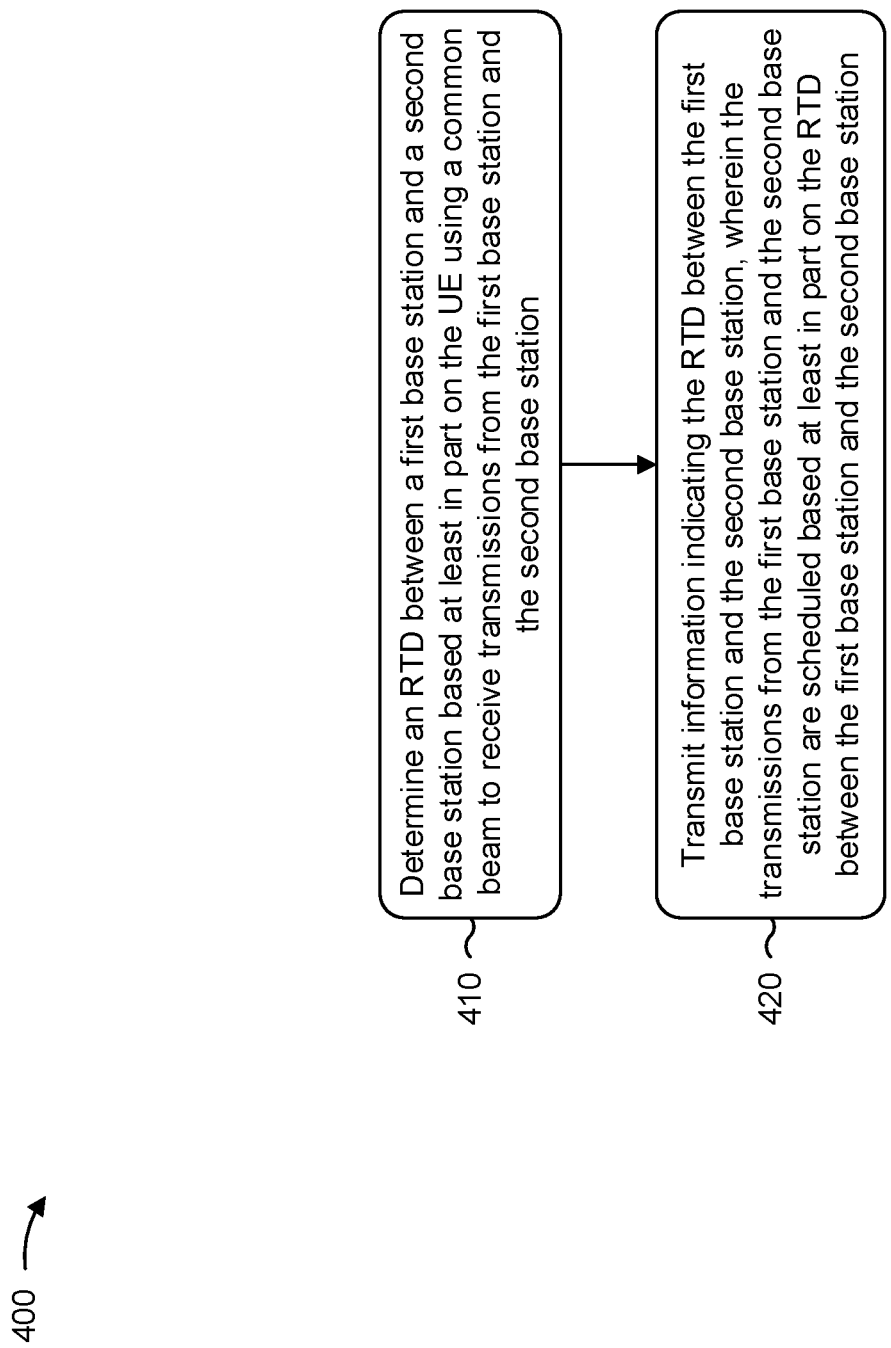

MITIGATING RECEIVE TIME DIFFERENCE WHEN USING A SINGLE BEAM IN INTER-BAND CARRIER AGGREGATION

CROSS-REFERENCE TO RELATED APPLICATION

This Patent application claims priority to U.S. Provisional Patent Application No. 63/003,048, filed on Mar. 31, 2020, entitled "MITIGATING RECEIVE TIME DIFFERENCE WHEN USING A SINGLE BEAM IN INTER-BAND CARRIER AGGREGATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for mitigating receive time difference (RTD) when using a single beam in inter-band carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include: determining a receive time difference (RTD) between a first base station and a second base station based at least in part on the UE using a common beam to receive transmissions from the first base station and the second base station; and transmitting information indicating the RTD between the first base station and the second base station, wherein the transmissions from the first base station and the second base station are scheduled based at least in part on the RTD between the first base station and the second base station.

In some aspects, a UE for wireless communication may include a memory and one or more processors operatively coupled to the memory. The memory and the one or more processors may be configured to: determine an RTD between a first base station and a second base station based at least in part on the UE using a common beam to receive transmissions from the first base station and the second base station; and transmit information indicating the RTD between the first base station and the second base station, wherein the transmissions from the first base station and the second base station are scheduled based at least in part on the RTD between the first base station and the second base station.

In some aspects, a non-transitory computer-readable medium may store one or more instructions for wireless communication. The one or more instructions, when executed by one or more processors of a UE, may cause the one or more processors to: determine an RTD between a first base station and a second base station based at least in part on the UE using a common beam to receive transmissions from the first base station and the second base station; and transmit information indicating the RTD between the first base station and the second base station, wherein the transmissions from the first base station and the second base station are scheduled based at least in part on the RTD between the first base station and the second base station.

In some aspects, an apparatus for wireless communication may include: means for determining an RTD between a first base station and a second base station based at least in part on the apparatus using a common beam to receive transmissions from the first base station and the second base station; and means for transmitting information indicating the RTD between the first base station and the second base station, wherein the transmissions from the first base station and the second base station are scheduled based at least in part on the RTD between the first base station and the second base station.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example process performed, for example, by a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
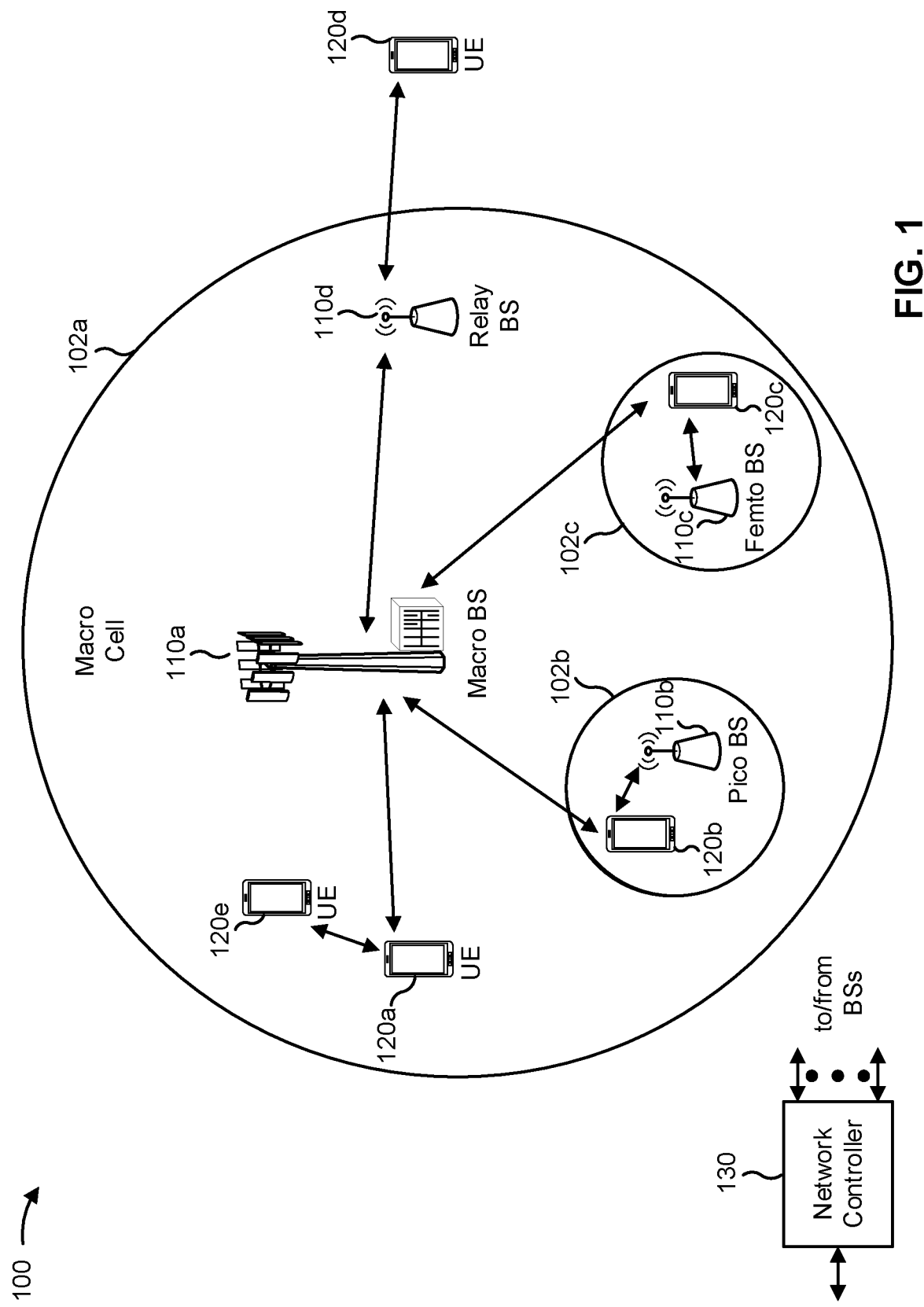
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
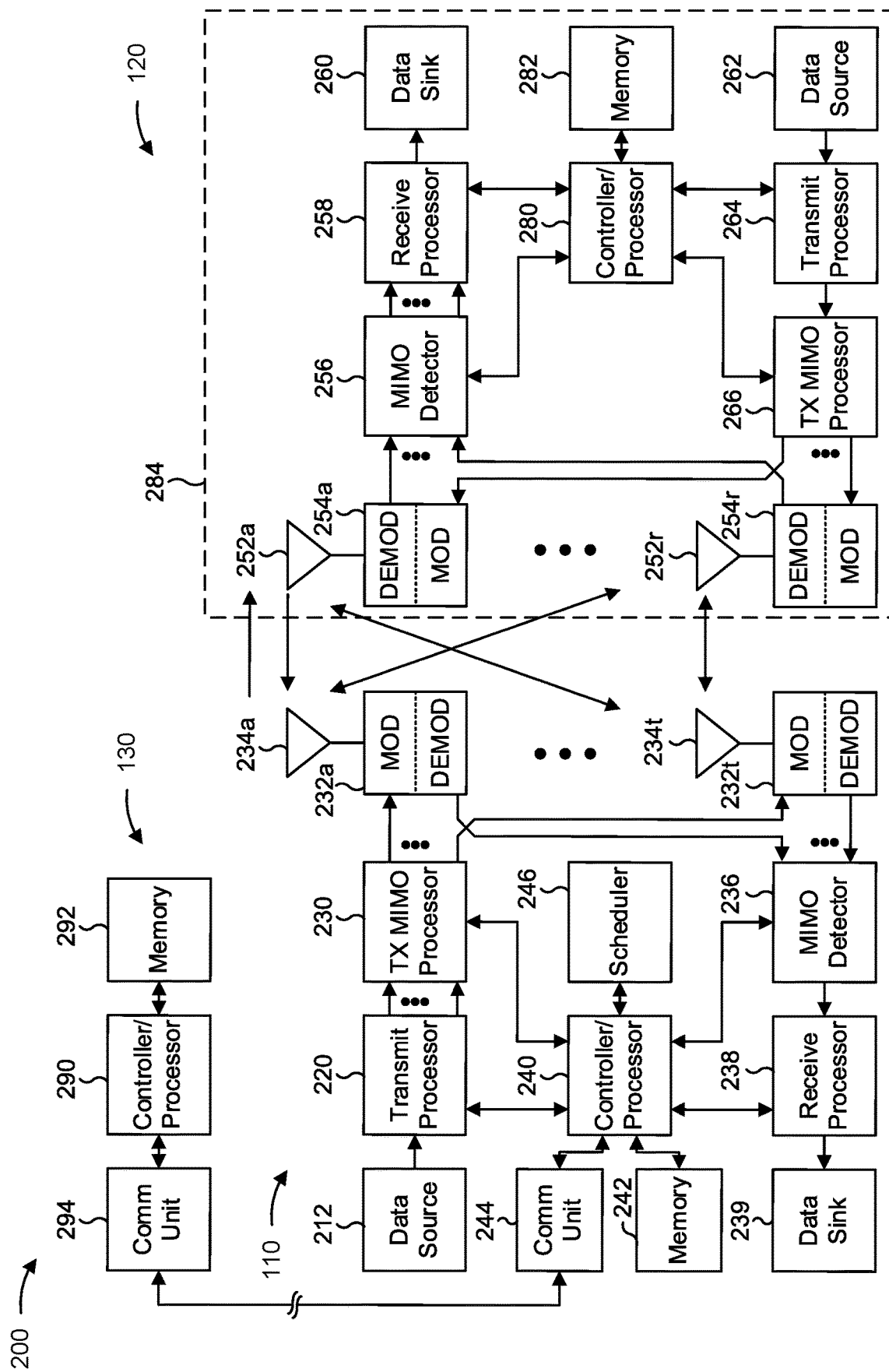
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-4.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-4.

Controller/processor 240 of base station 110, controller/processor 280 of UE 120, and/or any other component(s) of FIG. 2 may perform one or more techniques associated with mitigating a receive time difference (RTD) when using a single beam in inter-band carrier aggregation, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4 and/or other processes as described herein. In some aspects, executing instructions may include running the instructions, converting the instructions, compiling the instructions, and/or interpreting the instructions, among other examples.

In some aspects, UE 120 may include means for determining an RTD between a first base station 110 and a second base station 110 based at least in part on UE 120 using a common beam to receive transmissions from the first base station 110 and the second base station 110, means for transmitting information indicating the RTD between the first base station 110 and the second base station 110, wherein the transmissions from the first base station 110 and the second base station 110 are scheduled based at least in part on the RTD between the first base station 110 and the second base station 110, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Carrier aggregation generally enables two or more component carriers (sometimes referred to as carriers) to be combined (e.g., into a single channel) for a UE to enhance data capacity. For example, component carriers can be combined in the same frequency band, in different frequency bands, in the same frequency range, in different frequency ranges, and/or the like. Additionally, or alternatively, contiguous or non-contiguous component carriers can be combined. For example, in some aspects, carrier aggregation may be configured for a UE in an intra-band contiguous mode, where the aggregated component carriers are contiguous to one another and are in the same frequency band. Additionally, or alternatively, carrier aggregation may be configured in an intra-band non-contiguous mode, where the aggregated component carriers are in the same frequency band and are non-contiguous to one another. Additionally, or alternatively, carrier aggregation may be configured in an inter-band non-contiguous mode, where the aggregated component carriers are non-contiguous to one another and are in different frequency bands.

In general, when carrier aggregation is configured in an intra-band contiguous mode or an intra-band non-contiguous mode, the UE may communicate with different base stations using a common beam (e.g., the UE uses the same beam to communicate with different base stations using different component carriers). When carrier aggregation is configured in an inter-band mode (e.g., in FR2 that includes millimeter wave frequency bands from 24.25 GHz to 52.6 GHz), the UE may use separate beams for each component carrier (e.g., separate beams for each frequency band), or the UE may use a common beam (e.g., one beam across different frequency bands). In the former case, where the UE uses separate beams for each frequency band, each beam may be associated with distinct synchronization information and/or other timing parameters such that transmissions from different base stations do not need to be time aligned or otherwise synchronized. However, in cases where the UE uses a common beam across different frequency bands, a receive timing difference (RTD) from different base stations could be in a range from zero (0) to a maximum receive timing difference (MRTD), which generally refers to a relative RTD that the UE is capable of handling between a slot or symbol timing of a first signal received from a first base station in a first frequency band and a slot or symbol timing of a second signal received from a second base station in a second frequency band (e.g., due to differences in propagation delays from the different base stations, transmission timing differences between the different base stations, multipath propagation from the different base stations, and/or the like). Accordingly, in cases when the UE uses a common beam to communicate with different base stations in different frequency bands (e.g., in inter-band carrier aggregation), the UE and the base station(s) may need to account for the RTD from the different base stations when the UE switches the beam. Otherwise, whenever the UE switches the beam according to timing information from one of the base stations, the UE may lose one or more symbols on the other cell (e.g., in cases where the RTD exceeds a threshold, such as a cyclic prefix (CP) duration).

Some aspects described herein relate to techniques and apparatuses to mitigate an RTD between different base stations when a UE is using a single beam to communicate with the different base stations in inter-band carrier aggregation. In particular, as described herein, the UE may measure and report the RTD to a wireless network (e.g., one or more of the base stations, a network controller, and/or the like) such that the wireless network can adapt scheduling for the UE to the RTD between the different base stations. For example, in some aspects, the UE may report the RTD to the wireless network on a periodic basis, on an aperiodic basis (e.g., based at least in part on the RTD satisfying one or more thresholds), and/or the like, and the wireless network may configure scheduling information for the UE according to the reported RTD. For example, when the RTD exceeds a threshold that indicates a probability that the UE will lose one or more symbols if the UE were to perform a beam switch, the wireless network may configure one or more scheduling parameters to allow the UE to perform the beam switch during one or more symbols or slots in which no downlink data is scheduled to be transmitted to the UE. Additionally, or alternatively, the UE may select a suitable time (e.g., a symbol or slot) to perform a beam switch to avoid losing symbols on the component carriers in either frequency band. Additionally, or alternatively, the UE may select the suitable time to perform the beam switch to ensure that the beam switch does not collide with certain prioritized transmissions. In this way, by reporting the RTD to the network and adapting scheduling according to the reported RTD, the UE may switch the common beam used to communicate with different base stations in different frequency bands with minimal to no symbol loss, which improves reliability and performance of inter-band carrier aggregation.

Figure 3:
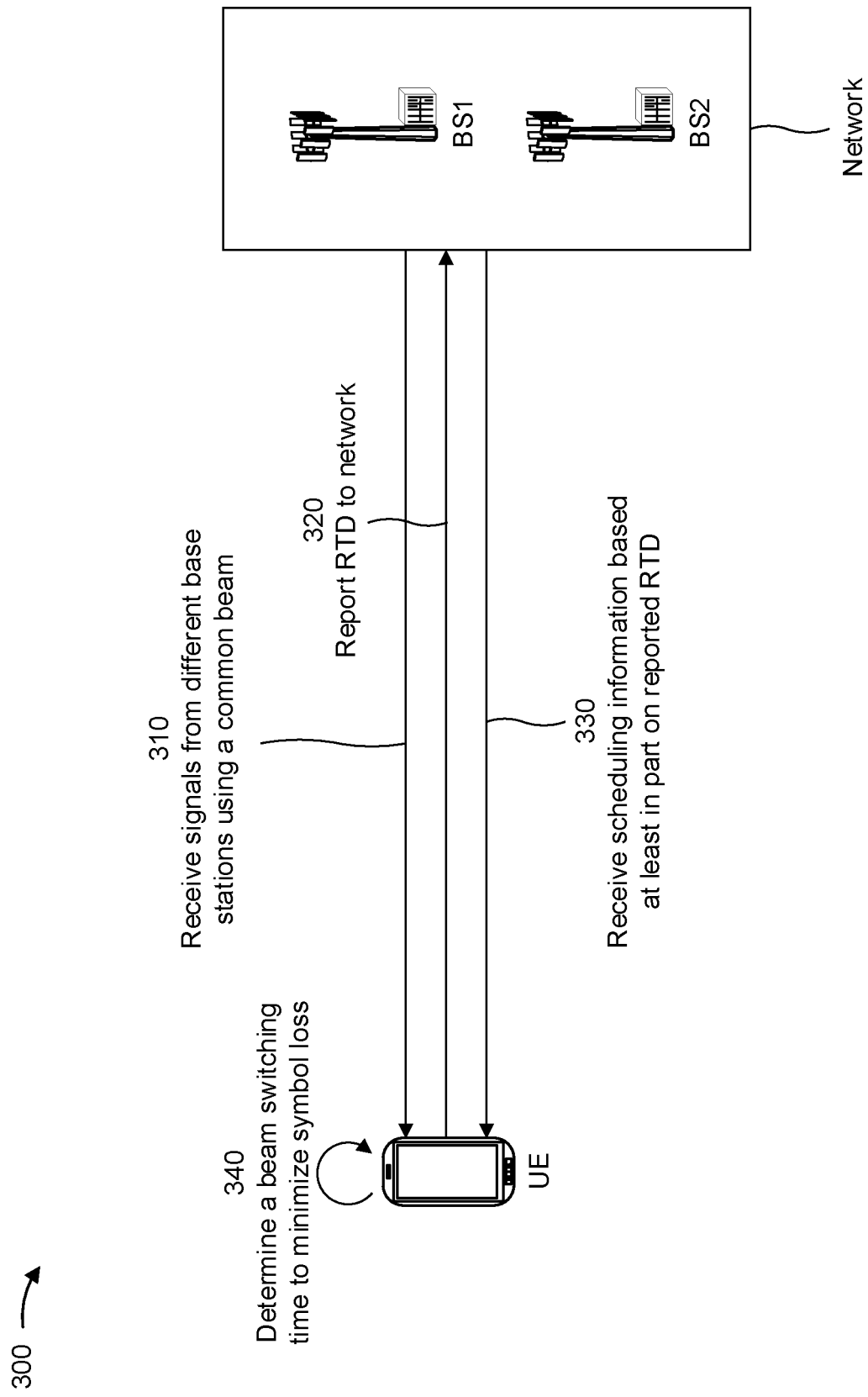
FIG. 3 is a diagram illustrating one or more examples of mitigating receive time difference (RTD) when using a single beam in inter-band carrier aggregation, in accordance with the present disclosure.

FIG. 3 is a diagram illustrating one or more examples 300 of mitigating an RTD when using a single beam in inter-band carrier aggregation, in accordance with the present disclosure. As shown in FIG. 3, example(s) 300 include a UE communicating with a first base station and a second base station in a wireless network. Furthermore, as described herein, the UE uses a common beam to communicate with the first base station using a first component carrier in a first frequency band and with the second base station using a second component carrier in a second frequency band (e.g., in inter-band carrier aggregation).

As shown in FIG. 3, and by reference number 310, the UE may receive signals from the first base station and the second base station using a common beam. For example, in some aspects, the signals received from the first base station and the second base station may include a reference signal (e.g., a synchronization signal block (SSB), a channel state information reference signal (CSI-RS), and/or the like), downlink signaling (e.g., a radio resource control (RRC) message, a medium access control (MAC) control element (MAC-CE), downlink control information (DCI), and/or the like), a physical downlink control channel (PDCCH) transmission, a physical downlink shared channel (PDSCH) transmission, and/or the like. In some aspects, the UE may receive the signals from the first base station and the second base station at the same time, or the UE may receive the signals from the first base station and the second base station at different times. For example, in some aspects, the UE may receive a first signal from the first base station at a first time, and may receive a second signal from the second base station at a second time, where a delta or time difference between the first time and the second time may correspond to an RTD between the first base station and the second base station, which may have a zero value when the first signal and the second signal are received at the same time or a non-zero value when there is a delay between the times when the respective signals are received at the UE.

As further shown in FIG. 3, and by reference number 320, the UE may report the RTD between the first base station and the second base station to the wireless network. For example, in some aspects, the UE may transmit information to report the RTD to the first base station, to the second base station, to a network controller (e.g., a central unit) associated with the first base station and the second base station, and/or the like. In some aspects, the UE may transmit the information to report the RTD to a wireless network at periodic intervals (e.g., at intervals that are configured via RRC signaling or other suitable downlink signaling). Additionally, or alternatively, the UE may transmit the information to report the RTD to the wireless network aperiodically when one or more conditions are satisfied. For example, in some aspects, the UE may be configured with one or more thresholds, which may include a low threshold (Tim), a high threshold ($T_{high}$), and/or the like, which may have values that are based on different fractions of a cyclic prefix duration or another suitable time period. For example, in some aspects, Tim may have a value that corresponds to a relatively small fraction of the cyclic prefix duration, which may indicate that there are no significant issues to be mitigated with respect to scheduling transmissions to the UE, and $T_{high}$ may have a value that corresponds to the cyclic prefix duration, a larger fraction of the cyclic prefix duration, a multiple of the cyclic prefix duration, and/or the like, which may indicate that the UE could lose one or more symbols from one base station if the UE were to perform a beam switch based on timing from the other base station.

Accordingly, in some aspects, the UE may report the RTD to the wireless network aperiodically when a value of the RTD satisfies (e.g., is equal to or greater than) $T_{high}$, and/or when the value of the RTD satisfies (e.g., is equal to or less than) $T_{low}$. Additionally, or alternatively, the UE may aperiodically report the RTD to the wireless network when the value of the RTD satisfies $T_{high}$ and/or $T_{low}$ and a hysteresis condition is satisfied. For example, in some aspects, the hysteresis condition may be based at least in part on a timer to constrain a quantity of RTD reports transmitted by the UE in a given period. Accordingly, in some aspects, the UE may start a timer when information reporting the RTD between the first base station and the second base station is transmitted to the wireless network, and the UE may refrain from transmitting any additional RTD reports until the timer has expired. Additionally, or alternatively, the values of $T_{high}$ and $T_{low}$ may be configured to provide a hysteresis that constrains the UE from transmitting many RTD reports each time that the RTD goes above $T_{high}$, below $T_{low}$, and/or the like. For example, in some aspects, the value of $T_{high}$ may be separated from the value of $T_{low}$ by an amount, a ratio, a percentage, and/or the like that causes the UE to report the RTD only when there has been a significant change to the RTD value.

For example, if the UE transmits information indicating the RTD to the wireless network when the RTD value satisfies $T_{high}$, which may cause the wireless network to alter scheduling to mitigate the high RTD value, the UE may not transmit any further RTD reports unless the RTD value satisfies $T_{low}$, which may cause the wireless network to adapt to the RTD value by applying normal scheduling for the UE. Additionally, or alternatively, if the UE transmits information indicating the RTD to the wireless network when the RTD value satisfies $T_{low}$, the UE may not transmit any further RTD reports unless the RTD value satisfies $T_{high}$, at which time the wireless network may initiate and/or resume altered scheduling to mitigate the high RTD value. In other words, when the UE transmits information indicating the RTD to the wireless network based at least in part on the RTD value satisfying $T_{high}$, the hysteresis condition may be satisfied when the RTD value satisfies $T_{low}$, and in a similar respect, the hysteresis condition may be satisfied when the RTD value satisfies $T_{high}$ after the UE has previously reported that the RTD value satisfies $T_{low}$.

As further shown in FIG. 3, and by reference number 330, the UE may receive, from the wireless network, scheduling information that is based at least in part on the RTD reported by the UE. For example, in some aspects, the wireless network may generally adapt the scheduling information to the most recent RTD by the UE, which may include altering the scheduling information to mitigate potential symbol loss that may occur when the UE reports an RTD that satisfies $T_{high}$ until the UE subsequently reports an RTD value that satisfies $T_{low}$, applying normal scheduling when the UE reports an RTD that satisfies $T_{low}$ until the UE subsequently reports an RTD value that satisfies $T_{high}$, and/or the like. Additionally, or alternatively, the wireless network may adapt the scheduling information based at least in part on a probability that the UE will perform a beam switch. For example, the wireless network may track information such as a location of the UE, changes to the RTD value, changes to one or more beam measurements (e.g., an RSRP value), and/or the like, and may alter the scheduling information to mitigate potential symbol loss when the RTD value satisfies $T_{high}$ or is in a range between $T_{high}$ and $T_{low}$ and there is a high probability that the UE will perform a beam switch (e.g., due to UE mobility).

For example, in some aspects, the wireless network may configure a parameter (e.g., k0) that indicates a number of slots between a slot in which a downlink grant is transmitted to schedule a data transmission and a slot in which the data transmission is to occur according to the RTD reported by the UE. For example, when the UE reports an RTD value that satisfies $T_{high}$, or the UE has not reported an RTD value that satisfies $T_{low}$ after having previously reported an RTD value that satisfies $T_{high}$, the wireless network may configure the parameter that indicates the number of slots between the downlink grant and the scheduled data transmission to have a value greater than zero (0). In particular, the parameter may have a value of zero to indicate that the scheduled data transmission will occur in the same slot in which the downlink grant is transmitted, a value of one to indicate that the scheduled data transmission will occur in the next slot after the slot in which the downlink grant is transmitted, and/or the like. Accordingly, when the parameter has a value greater than zero, the UE may be able to identify, in advance, the slot in which the data transmission is scheduled such that the UE can avoid performing a beam switch in that slot. In contrast, when the UE reports an RTD value that satisfies $T_{low}$, or the UE has not reported an RTD value that satisfies $T_{high}$ after having previously reported an RTD value that satisfies $T_{low}$, the parameter may have a value of zero (or a value greater than zero), as the UE may be able to perform the beam switch in sufficient time to receive the scheduled data transmission when the RTD between the first base station and the second base station is a small fraction of the cyclic prefix duration.

Additionally, or alternatively, in some aspects, the wireless network may schedule one or more guard symbols (e.g., by inserting the one or more guard symbols into a time division multiplexing (TDM) pattern for the UE) to allow the UE to perform a beam switch during the one or more guard symbols. For example, in some aspects, the wireless network may indicate the location of one or more guard symbols to the UE via RRC signaling or other suitable signaling such that the UE can perform the beam switch during guard symbols in which no downlink transmissions are scheduled. Additionally, or alternatively, the wireless network may extend one or more scheduling restrictions during which the UE is not permitted to transmit or receive, to allow the UE to perform a beam switch during the scheduling restriction(s). For example, a scheduling restriction may indicate that a UE is not to transmit or receive during a quantity of symbols prior to and/or after an SSB measurement time configuration (SMTC) window (e.g., one symbol prior to and one symbol after the SMTC window), and the wireless network may extend the scheduling restrictions by one or more symbols to allow the UE to perform the beam switch during the symbols in which the UE is otherwise restricted from transmitting and/or receiving data. In general, as described above, the wireless network may apply these RTD mitigation strategies (e.g., inserting additional guard symbols, extending scheduling restrictions, and/or the like) in cases where the UE reports an RTD value that satisfies $T_{high}$, in cases where the UE has not reported an RTD value that satisfies $T_{low}$ after having previously reported an RTD value that satisfies $T_{high}$, and/or the like.

As further shown in FIG. 3, and by reference number 340, the UE may determine a beam switching time to minimize symbol loss on each of the respective component carriers that the UE is using to communicate with the first base station and the second base station. In general, the UE may determine the beam switching time independent from reporting the RTD to the wireless network and/or according to scheduling information that the wireless network adapts to the reported RTD. For example, in some aspects, the UE may perform the beam switch outside a slot in which the UE is scheduled to receive a data transmission, which may be identified based on a slot in which the UE receives a downlink grant scheduling the data transmission and a value of a parameter that indicates a quantity of slots between the slot in which the downlink grant is transmitted and the slot in which the data transmission is scheduled. Additionally, or alternatively, as described above, the UE may perform the beam switch during a guard period in a TDM pattern. For example, the guard period may generally include one or more guard symbols during which a UE is to switch from downlink to uplink communication or switch from uplink to downlink communication, whereby the UE may perform the beam switch during the guard period without losing symbols on either component carrier. Additionally, or alternatively, as described above, the UE may perform the beam switch during one or more symbols associated with a scheduling restriction (e.g., symbols in which the UE is not scheduled to transmit or receive). Additionally, or alternatively, the UE may perform the beam switch during one or more symbols that do not collide with PDCCH symbols on either carrier (e.g., during PDSCH symbols), during one or more symbols that do not collide with DMRS symbols on either carrier, during an off period associated with a connected mode discontinuous reception (CDRX) cycle, and/or the like. In this way, the UE may select a suitable time to perform the beam switch to avoid and/or minimize symbol loss on either carrier.

Furthermore, in some aspects, the UE may align timing associated with the beam switch with timing associated with one or more of the component carriers. For example, in cases where the RTD satisfies a threshold (e.g., is less than or equal to 2 times the cyclic prefix duration), the UE may align the beam switch time with the average timing associated with the first base station and the second base station. In this way, as long as the RTD satisfies the threshold, aligning the beam switch time with the average timing associated with the first base station and the second base station may ensure that a difference between the time when the beam switch is performed and the symbol timing associated with the first base station and the second base station is within the cyclic prefix duration on each component carrier. However, when the RTD fails to satisfy the threshold (e.g., is greater than 2 times the cyclic prefix duration), the UE is likely to lose at least one symbol on at least one carrier. Accordingly, when the RTD fails to satisfy the threshold, the UE may align the beam switch time with the timing associated with one carrier and may drop one or more symbols on the other carrier.

In some aspects, in cases where the RTD fails to satisfy the threshold and the UE has to drop one or more symbols from one carrier (e.g., because the beam switch time cannot be aligned to a guard period, a scheduling restriction, a CDRX off period, and/or the like), the UE may select the component carrier to be aligned with the beam switch time and the component carrier to be dropped according to one or more criteria. For example, in some aspects, the wireless network may indicate which component carrier is to be dropped via downlink signaling (e.g., RRC signaling, a MAC-CE, DCI, and/or the like). Additionally, or alternatively, the UE may apply one or more rules to determine which component carrier to align with the beam switch and which component carrier is to be dropped. For example, in cases where one component carrier is a primary cell (Pcell) or a primary secondary cell (PScell) and the other component carrier(s) each correspond to a secondary cell (Scell), the UE may align the beam switch with the timing associated with the Pcell or the PScell and the UE may drop the Scell(s). Alternatively, in cases where all component carriers are Scells, the UE may align the beam switch with the timing associated with the Scell that has an SSB configuration, a beam management reference signal configuration, a highest throughput, a highest RSRP, and/or the like. For example, in some aspects, the UE may be configured to apply a hierarchy in which the SSB and/or beam management reference signal configuration have a highest priority, and throughput and RSRP have equal priorities or relative priorities that depend on a service type or other factors (e.g., the UE may prioritize throughput when utilizing a service that has a high bandwidth demand, may prioritize RSRP when utilizing a service that has a high reliability demand, and/or the like).

As indicated above, FIG. 3 is provided as one or more examples. Other examples may differ from what is described with respect to FIG. 3.

FIG. 4 is a diagram illustrating an example process 400 performed, for example, by a UE, in accordance with the present disclosure. Example process 400 is an example where the UE (e.g., UE 120 and/or the like) performs operations associated with mitigating an RTD when using a single beam in inter-band carrier aggregation.

As shown in FIG. 4, in some aspects, process 400 may include determining an RTD between a first base station and a second base station based at least in part on the UE using a common beam to receive transmissions from the first base station and the second base station (block 410). For example, the UE may determine (e.g., using antenna 252, DEMOD 254, MIMO detector 256, receive processor 258, controller/processor 280, memory 282, and/or the like) an RTD between a first base station and a second base station based at least in part on the UE using a common beam to receive transmissions from the first base station and the second base station, as described above.

As further shown in FIG. 4, in some aspects, process 400 may include transmitting information indicating the RTD between the first base station and the second base station, wherein the transmissions from the first base station and the second base station are scheduled based at least in part on the RTD between the first base station and the second base station (block 420). For example, the UE may transmit (e.g., using controller/processor 280, transmit processor 264, TX MIMO processor 266, MOD 254, antenna 252, memory 282, and/or the like) information indicating the RTD between the first base station and the second base station, as described above. In some aspects, the transmissions from the first base station and the second base station are scheduled based at least in part on the RTD between the first base station and the second base station.

Process 400 may include additional aspects, such as any single aspect or any combination of aspects described below and/or in connection with one or more other processes described elsewhere herein.

In a first aspect, the information indicating the RTD between the first base station and the second base station is transmitted at periodic intervals.

In a second aspect, alone or in combination with the first aspect, the information indicating the RTD between the first base station and the second base station is transmitted based at least in part on the RTD satisfying one or more thresholds.

In a third aspect, alone or in combination with one or more of the first and second aspects, the information indicating the RTD between the first base station and the second base station is transmitted further based at least in part on determining that a hysteresis condition is satisfied.

In a fourth aspect, alone or in combination with one or more of the first through third aspects, the one or more thresholds are based at least in part on a duration of a cyclic prefix.

In a fifth aspect, alone or in combination with one or more of the first through fourth aspects, process 400 includes determining a slot in which data is scheduled to be transmitted to the UE, and switching the common beam used to receive the transmissions from the first base station and the second base station outside the slot in which the data is scheduled to be transmitted to the UE.

In a sixth aspect, alone or in combination with one or more of the first through fifth aspects, the slot in which the data is scheduled to be transmitted to the UE is determined based at least in part on a parameter indicating a number of slots between a slot in which a downlink grant scheduling the data is transmitted and the slot in which the data is scheduled to be transmitted to the UE.

In a seventh aspect, alone or in combination with one or more of the first through sixth aspects, the parameter has a value based at least in part on the RTD between the first base station and the second base station.

In an eighth aspect, alone or in combination with one or more of the first through seventh aspects, process 400 includes switching the common beam used to receive the transmissions from the first base station and the second base station during one or more guard symbols.

In a ninth aspect, alone or in combination with one or more of the first through eighth aspects, process 400 includes receiving signaling indicating the one or more guard symbols based at least in part on the RTD between the first base station and the second base station satisfying a threshold.

In a tenth aspect, alone or in combination with one or more of the first through ninth aspects, process 400 includes switching the common beam used to receive the transmissions from the first base station and the second base station during a set of symbols associated with a scheduling restriction.

In an eleventh aspect, alone or in combination with one or more of the first through tenth aspects, a number of symbols in the set of symbols associated with the scheduling restriction is based at least in part on the RTD between the first base station and the second base station.

In a twelfth aspect, alone or in combination with one or more of the first through eleventh aspects, process 400 includes aligning a beam switching time with an average symbol timing among a first carrier associated with the first base station and a second carrier associated with the second base station based at least in part on the RTD between the first base station and the second base station failing to satisfy a threshold.

In a thirteenth aspect, alone or in combination with one or more of the first through twelfth aspects, process 400 includes aligning a beam switching time with a symbol timing associated with a first carrier associated with the first base station or a second carrier associated with the second base station based at least in part on the RTD between the first base station and the second base station satisfying a threshold.

In a fourteenth aspect, alone or in combination with one or more of the first through thirteenth aspects, process 400 includes receiving signaling indicating whether to align the beam switching time with the symbol timing associated with the first carrier or the second carrier.

In a fifteenth aspect, alone or in combination with one or more of the first through fourteenth aspects, process 400 includes aligning the beam switching time with the symbol timing associated with the first carrier based at least in part on the first carrier corresponding to a Pcell or a PScell and the second carrier corresponding to an Scell.

In a sixteenth aspect, alone or in combination with one or more of the first through fifteenth aspects, process 400 includes aligning the beam switching time with the symbol timing associated with a carrier having one or more of an SSB configuration, a beam management reference signal configuration, a highest throughput, or a highest RSRP based at least in part on the first carrier and the second carrier each corresponding to an Scell.

In a seventeenth aspect, alone or in combination with one or more of the first through sixteenth aspects, process 400 includes switching the common beam used to receive the transmissions from the first base station and the second base station during one or more symbols that do not collide with PDCCH symbols on a first carrier associated with the first base station or a second carrier associated with the second base station.

In an eighteenth aspect, alone or in combination with one or more of the first through seventeenth aspects, process 400 includes switching the common beam used to receive the transmissions from the first base station and the second base station during one or more symbols that do not collide with DMRS symbols on a first carrier associated with the first base station or a second carrier associated with the second base station.

In a nineteenth aspect, alone or in combination with one or more of the first through eighteenth aspects, process 400 includes switching the common beam used to receive the transmissions from the first base station and the second base station during an off period associated with a CDRX cycle.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The following provides an overview of some Aspects of the present disclosure:

Aspect 1: A method of wireless communication performed by a UE, comprising: determining an RTD between a first base station and a second base station based at least in part on the UE using a common beam to receive transmissions from the first base station and the second base station; and transmitting information indicating the RTD between the first base station and the second base station, wherein the transmissions from the first base station and the second base station are scheduled based at least in part on the RTD between the first base station and the second base station.

Aspect 2: The method of Aspect 1, wherein the information indicating the RTD between the first base station and the second base station is transmitted at periodic intervals.

Aspect 3: The method of any of Aspects 1-2, wherein the information indicating the RTD between the first base station and the second base station is transmitted based at least in part on the RTD satisfying one or more thresholds.

Aspect 4: The method of Aspect 3, wherein the information indicating the RTD between the first base station and the second base station is transmitted further based at least in part on determining that a hysteresis condition is satisfied.

Aspect 5: The method of any of Aspects 3-4, wherein the one or more thresholds are based at least in part on a duration of a cyclic prefix.

Aspect 6: The method of any of Aspects 1-5, further comprising: determining a slot in which data is scheduled to be transmitted to the UE; and switching the common beam used to receive the transmissions from the first base station and the second base station outside the slot in which the data is scheduled to be transmitted to the UE.

Aspect 7: The method of Aspect 6, wherein the slot in which the data is scheduled to be transmitted to the UE is determined based at least in part on a parameter indicating a number of slots between a slot in which a downlink grant scheduling the data is transmitted and the slot in which the data is scheduled to be transmitted to the UE.

Aspect 8: The method of Aspect 7, wherein the parameter has a value based at least in part on the RTD between the first base station and the second base station.

Aspect 9: The method of any of Aspects 1-8, further comprising: switching the common beam used to receive the transmissions from the first base station and the second base station during one or more guard symbols.

Aspect 10: The method of Aspect 9, further comprising: receiving signaling indicating the one or more guard symbols based at least in part on the RTD between the first base station and the second base station satisfying a threshold.

Aspect 11: The method of any of Aspects 1-8, further comprising: switching the common beam used to receive the transmissions from the first base station and the second base station during a set of symbols associated with a scheduling restriction.

Aspect 12: The method of Aspect 11, wherein a number of symbols in the set of symbols associated with the scheduling restriction is based at least in part on the RTD between the first base station and the second base station.

Aspect 13: The method of any of Aspects 1-12, further comprising: aligning a beam switching time with an average symbol timing among a first carrier associated with the first base station and a second carrier associated with the second base station based at least in part on the RTD between the first base station and the second base station failing to satisfy a threshold.

Aspect 14: The method of any of Aspects 1-12, further comprising: aligning a beam switching time with a symbol timing associated with a first carrier associated with the first base station or a second carrier associated with the second base station based at least in part on the RTD between the first base station and the second base station satisfying a threshold.

Aspect 15: The method of Aspect 14, further comprising: receiving signaling indicating whether to align the beam switching time with the symbol timing associated with the first carrier or the second carrier.

Aspect 16: The method of Aspect 14, further comprising: aligning the beam switching time with the symbol timing associated with the first carrier based at least in part on the first carrier corresponding to a Pcell or a PScell and the second carrier corresponding to an Scell.

Aspect 17: The method of Aspect 14, further comprising: aligning the beam switching time with the symbol timing associated with a carrier having one or more of an SSB configuration, a beam management reference signal configuration, a highest throughput, or a highest RSRP based at least in part on the first carrier and the second carrier each corresponding to an Scell.

Aspect 18: The method of any of Aspects 1-17, further comprising: switching the common beam used to receive the transmissions from the first base station and the second base station during one or more symbols that do not collide with PDCCH symbols on a first carrier associated with the first base station or a second carrier associated with the second base station.

Aspect 19: The method of any of Aspects 1-18, further comprising: switching the common beam used to receive the transmissions from the first base station and the second base station during one or more symbols that do not collide with DMRS symbols on a first carrier associated with the first base station or a second carrier associated with the second base station.

Aspect 20: The method of any of Aspects 1-19, further comprising: switching the common beam used to receive the transmissions from the first base station and the second base station during an off period associated with a CDRX cycle.

Aspect 21: An apparatus for wireless communication at a device, comprising a processor; memory coupled with the processor; and instructions stored in the memory and executable by the processor to cause the apparatus to perform the method of any of Aspects 1-20.

Aspect 22: A device for wireless communication, comprising a memory and one or more processors coupled to the memory, the memory and the one or more processors configured to perform the method of any of Aspects 1-20.

Aspect 23: An apparatus for wireless communication, comprising at least one means for performing the method of any of Aspects 1-20.

Aspect 24: A non-transitory computer-readable medium storing code for wireless communication, the code comprising instructions executable by a processor to perform the method of any of Aspects 1-20.

Aspect 25: A non-transitory computer-readable medium storing a set of instructions for wireless communication, the set of instructions comprising one or more instructions that, when executed by one or more processors of a device, cause the device to perform the method of any of Aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    determining a receive time difference (RTD) between a first base station and a second base station based at least in part on the UE using a common beam to receive transmissions from the first base station and the second base station, wherein the UE is configured to use the common beam to receive transmissions from the first base station using a first component carrier and receive transmissions from the second base station using a second component carrier different than the first component carrier; and
    transmitting information indicating the RTD between the first base station and the second base station, wherein the transmissions from the first base station and the second base station are scheduled based at least in part on the RTD between the first base station and the second base station.

2. The method of claim 1, wherein the information indicating the RTD between the first base station and the second base station is transmitted at periodic intervals.

3. The method of claim 1, wherein information indicating the RTD between the first base station and the second base station is transmitted based at least in part on the RTD satisfying one or more thresholds.

4. The method of claim 3, wherein the information indicating the RTD between the first base station and the second base station is transmitted further based at least in part on determining that a hysteresis condition is satisfied.

5. The method of claim 3, wherein the one or more thresholds are based at least in part on a duration of a cyclic prefix.

6. The method of claim 1, further comprising:
    determining a slot in which data is scheduled to be transmitted to the UE; and
    switching the common beam used to receive the transmissions from the first base station and the second base station outside the slot in which the data is scheduled to be transmitted to the UE.

7. The method of claim 6, wherein the slot in which the data is scheduled to be transmitted to the UE is determined based at least in part on a parameter indicating a number of slots between a slot in which a downlink grant scheduling the data is transmitted and the slot in which the data is scheduled to be transmitted to the UE.

8. The method of claim 7, wherein the parameter has a value based at least in part on the RTD between the first base station and the second base station.

9. The method of claim 1, further comprising:
switching the common beam used to receive the transmissions from the first base station and the second base station during one or more guard symbols.

10. The method of claim 9, further comprising:
receiving signaling indicating the one or more guard symbols based at least in part on the RTD between the first base station and the second base station satisfying a threshold.

11. The method of claim 1, further comprising:
switching the common beam used to receive the transmissions from the first base station and the second base station during a set of symbols associated with a scheduling restriction.

12. The method of claim 11, wherein a number of symbols in the set of symbols associated with the scheduling restriction is based at least in part on the RTD between the first base station and the second base station.

13. The method of claim 1, further comprising:
aligning a beam switching time with an average symbol timing among the first component carrier associated with the first base station and the second component carrier associated with the second base station based at least in part on the RTD between the first base station and the second base station failing to satisfy a threshold.

14. The method of claim 1, further comprising:
aligning a beam switching time with a symbol timing associated with the first component carrier associated with the first base station or the second component carrier associated with the second base station based at least in part on the RTD between the first base station and the second base station satisfying a threshold.

15. The method of claim 14, further comprising:
receiving signaling indicating whether to align the beam switching time with the symbol timing associated with the first component carrier or the second component carrier.

16. The method of claim 14, further comprising:
aligning the beam switching time with the symbol timing associated with the first component carrier based at least in part on the first component carrier corresponding to a primary cell or a primary secondary cell and the second component carrier corresponding to a secondary cell.

17. The method of claim 14, further comprising:
aligning the beam switching time with the symbol timing associated with a component carrier having one or more of a synchronization signal block configuration, a beam management reference signal configuration, a highest throughput, or a highest reference signal received power based at least in part on the first component carrier and the second component carrier each corresponding to a secondary cell.

18. The method of claim 1, further comprising:
switching the common beam used to receive the transmissions from the first base station and the second base station during one or more symbols that do not collide with physical downlink control channel symbols on the first component carrier associated with the first base station or the second component carrier associated with the second base station.

19. The method of claim 1, further comprising:
switching the common beam used to receive the transmissions from the first base station and the second base station during one or more symbols that do not collide with demodulation reference signal symbols on the first component carrier associated with the first base station or the second component carrier associated with the second base station.

20. The method of claim 1, further comprising:
switching the common beam used to receive the transmissions from the first base station and the second base station during an off period associated with a connected mode discontinuous reception cycle.

21. A user equipment (UE) for wireless communication, comprising:
a memory; and
one or more processors coupled to the memory, the one or more processors configured to:
determine a receive time difference (RTD) between a first base station and a second base station based at least in part on the UE using a common beam to receive transmissions from the first base station and the second base station, wherein the UE is configured to use the common beam to receive transmissions from the first base station using a first component carrier and receive transmissions from the second base station using a second component carrier different than the first component carrier; and
transmit information indicating the RTD between the first base station and the second base station, wherein the transmissions from the first base station and the second base station are scheduled based at least in part on the RTD between the first base station and the second base station.

22. The UE of claim 21, wherein the information indicating the RTD between the first base station and the second base station is transmitted at periodic intervals or based at least in part on the RTD satisfying one or more thresholds.

23. The UE of claim 21, wherein the one or more processors are further configured to:
determine a slot in which data is scheduled to be transmitted to the UE; and
switch the common beam used to receive the transmissions from the first base station and the second base station outside the slot in which the data is scheduled to be transmitted to the UE.

24. The UE of claim 21, wherein the one or more processors are further configured to:
switch the common beam used to receive the transmissions from the first base station and the second base station during one or more guard symbols, during a set of symbols associated with a scheduling restriction, or during an off period associated with a connected mode discontinuous reception cycle.

25. The UE of claim 21, wherein the one or more processors are further configured to:
align a beam switching time with an average symbol timing among the first component carrier associated with the first base station and the second component carrier associated with the second base station based at least in part on the RTD between the first base station and the second base station failing to satisfy a threshold.

26. The UE of claim 21, wherein the one or more processors are further configured to:
align a beam switching time with a symbol timing associated with the first component carrier associated with the first base station or the second component carrier associated with the second base station based at least in part on the RTD between the first base station and the second base station satisfying a threshold.

27. The UE of claim 21, wherein the one or more processors are further configured to:
   switch the common beam used to receive the transmissions from the first base station and the second base station during one or more symbols that do not collide with physical downlink control channel symbols on the first component carrier associated with the first base station or the second component carrier associated with the second base station.

28. The UE of claim 21, wherein the one or more processors are further configured to:
   switch the common beam used to receive the transmissions from the first base station and the second base station during one or more symbols that do not collide with demodulation reference signal symbols on the first component carrier associated with the first base station or the second component carrier associated with the second base station.

29. A non-transitory computer-readable medium storing one or more instructions for wireless communication, the one or more instructions comprising:
   one or more instructions that, when executed by one or more processors of a user equipment (UE), cause the one or more processors to:
      determine a receive time difference (RTD) between a first base station and a second base station based at least in part on the UE using a common beam to receive transmissions from the first base station and the second base station, wherein the UE is configured to use the common beam to receive transmissions from the first base station using a first component carrier and receive transmissions from the second base station using a second component carrier different than the first component carrier; and
      transmit information indicating the RTD between the first base station and the second base station, wherein the transmissions from the first base station and the second base station are scheduled based at least in part on the RTD between the first base station and the second base station.

30. An apparatus for wireless communication, comprising:
   means for determining a receive time difference (RTD) between a first base station and a second base station based at least in part on the apparatus using a common beam to receive transmissions from the first base station and the second base station, wherein the apparatus is configured to use the common beam to receive transmissions from the first base station using a first component carrier and receive transmissions from the second base station using a second component carrier different than the first component carrier; and
   means for transmitting information indicating the RTD between the first base station and the second base station, wherein the transmissions from the first base station and the second base station are scheduled based at least in part on the RTD between the first base station and the second base station.

* * * * *